United States Patent Office 3,037,485
Patented June 5, 1962

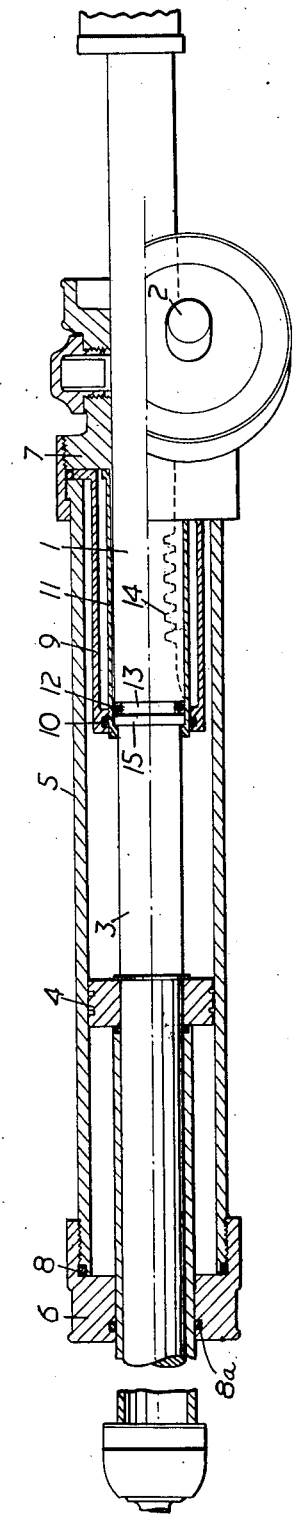

3,037,485
VEHICULAR STEERING GEAR
Frederick John Adams, Houghton Regis, near Dunstable, England, assignor to Hydrosteer Limited, a company of Great Britain
Filed Sept. 28, 1959, Ser. No. 842,771
Claims priority, application Great Britain Nov. 26, 1958
3 Claims. (Cl. 121—38)

This invention relates to a sealing assemblies for hydraulic steering mechanism for vehicles. One form of such mechanism (which will be termed steering mechanism of the kind referred to) comprises a rack and a pinion and an hydraulic power unit which provides power assistance to the manual steering effort applied to the pinion.

In one arrangement of steering mechanism of this kind the rack and the power unit comprising a piston and a cylinder are arranged "in-line," the rack being connected to the cylinder: such an in-line arrangement provides an efficient unit but, as made hitherto, it has the disadvantage of large overall length due to the fact that the length of the cylinder forms an extension of the length of the rack: this renders it difficult and in many cases impossible to incorporate the combined unit in a vehicle.

The main object of this invention is to provide a sealing assembly which enables construction of a steering gear arrangement which while retaining all the benefits of the in-line unit will at the same time avoid the disadvantage referred to.

According to the present invention the rack is connected to the piston and is so disposed in reference to the cylinder as to move into the cylinder as the piston moves in one direction down its stroke and the cylinder requires a liquid tight seal at its ends, but the cross-sectional form of the rack does not lend itself to the usual sliding seal arrangement; the invention, furthermore, provides between the rack and that end wall of the cylinder through which the rack enters the cylinder a form of expansible-contractable closure which is sealed at one part to the cylinder and at another part against the entry end of the rack clear of its teeth.

By reason of this invention, the overall length of the unit can be considerably reduced for a given stroke of the piston and rack: the necessary lengths of the cylinder and of the rack are no longer in extension one of the other but are, so to speak, overlapped by approximately the extent to which the toothed part of the rack enters the cylinder.

In addition the form of seal which is provided enables closure to be taken against the rack at a point in its length which is clear of the teeth and so can be made cylindrical to obtain a proper seal with the rack, the contractible nature of the closure enabling that part of the rack teeth which is necessarily overlaid by the closure when the rack moves increasingly into the cylinder to emerge as the rack increasingly moves out of the cylinder.

The seal or closure arrangement can take various forms but a convenient form comprises two sleeves which are within one another; the outer sleeve is connected and sealed at one end to that end wall of the cylinder about an opening through which the rack enters the cylinder and extends into the cylinder where it has a sealing ring to engage the outer surface of the inner sleeve. The inner sleeve provides at its inner surface a sliding sealing surface for a sealing ring on the rack near the end of its toothed part: the inner sleeve is permitted movement relative to the rack for about half the movement of the rack, the limit being set by stops on the rack which can be constituted by the piston and by a flange on the rack: in addition this inner sleeve is arranged to abut the end wall of the cylinder.

With this arrangement the length of the inner and outer sleeves requires to be only about one half of the movement of the rack, the sliding seal being transferred from the inner surface of the inner sleeve to the outer surface of that sleeve as the rack moves.

The invention is shown by the accompanying drawing in which the rack is indicated at 1 and the steering control pinion spindle element at 2: the rack is extended to provide a cylindrical piston rod 3 having secured to it a double acting piston 4 reciprocably mounted in a power cylinder 5. The end walls of the cylinder are indicated at 6, 7, the wall 6 being sealed to the adjacent end of the cylinder by a sealing ring 8. The piston rod 3 passes out through one end wall 6 via a sealing ring 8a and the rack 1 is arranged to enter the cylinder 5 through an opening in the other end wall 7 so as to reduce the overall length of the assembly.

To seal the opening in the end wall 7 a telescopic sealing assembly is provided comprising an outer sleeve 9 concentric with the rack bar 1 clamped at one end to the end wall 7 and having at its other end within the sleeve 9 a groove receiving a sealing ring 10. This sealing ring seals against the outer surface of an inner sleeve 11 concentric with and interposed between the rack bar and the outer sleeve. The inner surface of the sleeve 11 seals against a sealing ring 12 located in a recess 13 in a cylindrical portion of the rack 1 clear of its teeth 14. This inner sleeve is picked-up by a flange 15 when the rack moves out of the outer sleeve 9 into the cylinder beyond the outer sleeve, and the other end of the sleeve 11 is arranged to abut the end wall 7 when the rack has moved to the central position shown in the drawing.

The hydraulic supply and return connections to the double acting power unit are not shown but would be arranged in any normal manner as would also a control valve which would be operated during a small permitted free movement between the manual input and the output movement of the rack 1: thus the teeth 14 of the rack could be inclined to set up an axial valve operating movement of the spindle 2.

I claim:
1. A telescopic sealing assembly for preventing leakage of fluid between the piston rod and cylinder of a hydraulic steering gear including a cylinder, a double acting steering mechanism piston mounted for reciprocation in said cylinder and having a piston rod extending slidably through and in sealed relation to one end of said cylinder, a toothed rack bar in line with said piston rod and extending from outside said cylinder through the opposite end of said cylinder with the rack bar teeth in part being housed within said cylinder itself between the ends thereof, the toothed portion of the rack bar and the cylinder thereby being overlapped with one another, and a steering control element mounted on said cylinder for cooperation with said rack bar, said telescopic assembly comprising an outer sleeve concentric with said rack bar and having one of its ends fixed to said cylinder opposite end and having its other end within said cylinder and spaced from said cylinder opposite end, an inner sleeve within said cylinder concentric with and interposed between said rack bar and said outer sleeve, sealing means within said cylinder between the interior of said other end of said outer sleeve and the exterior of said inner sleeve, and sealing means within said cylinder between the exterior of said rack bar and the interior of said inner sleeve.

2. A telescopic sealing assembly for preventing leakage of fluid between the piston rod and cylinder of a hydraulic steering gear including a cylinder, a double acting steering mechanism piston mounted for reciprocation in said cylinder and having a piston rod extending slidably through and in sealed relation to one end of said cylinder; a toothed rack bar in line with said piston rod and extending from outside said cylinder through the opposite end of said cylinder with the rack bar teeth in part being housed within said cylinder itself between the ends thereof, the toothed portion of the rack bar and the cylinder thereby being overlapped with one another, and a steering control element mounted on said cylinder for cooperation with said rack bar, said telescopic assembly comprising an outer sleeve concentric with said rack bar and having one of its ends fixed to said cylinder opposite end and having its other end within said cylinder and spaced from said cylinder opposite end, an inner sleeve concentric with and interposed between said rack bar and said outer sleeve, a groove in the inside of said other end of said outer sleeve, a sealing ring in said groove and engaging the outer surface of said inner sleeve, a recess in said rack bar between said piston and the rack bar teeth, and a sealing ring in said recess and engaging the inner surface of said inner sleeve.

3. A sealing assembly according to claim 1 including limiting means to limit the movement of the rack to a predetermined maximum.

References Cited in the file of this patent
UNITED STATES PATENTS

| | | |
|---|---|---|
| 679,343 | Singer | July 30, 1901 |
| 1,527,769 | Ashbrook et al. | Feb. 24, 1925 |
| 1,585,175 | Steele | May 18, 1926 |
| 2,152,511 | Vanderwerf | Mar. 28, 1939 |
| 2,224,708 | Van Sittert | Dec. 10, 1940 |
| 2,554,802 | Waas | May 29, 1951 |
| 2,663,285 | Johnston et al. | Dec. 22, 1953 |
| 2,791,871 | Johnson | May 14, 1957 |
| 2,837,167 | Loofbourrow | June 3, 1958 |
| 2,876,652 | Pankonin | Mar. 10, 1959 |

FOREIGN PATENTS

| | | |
|---|---|---|
| 984,289 | France | Feb. 21, 1951 |
| 1,168,537 | France | Sept. 1, 1958 |